United States Patent [19]

Martin

[11] Patent Number: 4,998,438

[45] Date of Patent: Mar. 12, 1991

[54] DIGITAL AIR PRESSURE GAUGE AND INFLATION DEVICE

[76] Inventor: Jerry L. Martin, 6387 Dove St., Norfolk, Va. 23513

[21] Appl. No.: 526,993

[22] Filed: May 22, 1990

[51] Int. Cl.⁵ .......................................... B60C 23/00
[52] U.S. Cl. .................................. 73/146.8; 137/228
[58] Field of Search ............... 73/146.8, 146.5, 146.3; 137/227, 228, 229

[56] References Cited

U.S. PATENT DOCUMENTS

| | | | |
|---|---|---|---|
| 1,369,555 | 2/1921 | Schweinert et al. | 137/228 |
| 1,428,502 | 9/1922 | Hansen | 137/228 |
| 3,303,696 | 2/1967 | Capparelle | 73/146.8 |
| 3,999,430 | 12/1976 | Parduhn | 73/146.3 |
| 4,250,759 | 2/1981 | Vago et al. | 73/723 |
| 4,581,925 | 4/1986 | Crutcher | 73/146.8 |
| 4,704,901 | 11/1987 | Rocco et al. | 73/146.8 |
| 4,723,445 | 2/1988 | Ripley et al. | 73/146.3 |
| 4,748,845 | 6/1988 | Rocco et al. | 73/146.8 |
| 4,763,517 | 8/1988 | Feinberg | 73/146.8 |
| 4,793,177 | 12/1988 | Wu et al. | 73/146.8 |

Primary Examiner—Donald O. Woodiel
Attorney, Agent, or Firm—Shlesinger Arkwright & Garvey

[57] ABSTRACT

A tire pressure gauge having an electronic air pressure detector connected to a digital readout. The tire pressure gauge includes a pair of tubular members. One of the members having one end adapted to engage a tire valve stem while the other member includes an end having an inflation value therein. At the side of the casing is a pressure release valve for releasing pressure from the tire through the tire pressure gauge without removal of the gauge from the tire valve stem.

5 Claims, 1 Drawing Sheet

DIGITAL AIR PRESSURE GAUGE AND INFLATION DEVICE

FIELD OF THE INVENTION

This invention relates to a tire pressure gauge and tire inflation device for use in inflation and deflation of a tire.

BACKGROUND OF THE INVENTION

The need for tire pressure gauges has been apparent since the introduction of the pneumatic tire. Various types of tire pressure gauges have been manufactured which perform with varying degrees of accuracy. The most accurate are those using a pressure transducer to measure the air pressure and relay the signal to a display.

Regardless of the method of measuring tire air pressure, the previously mentioned tire gauges all require removal from the tire stem in order to release air from the tire or add air to the tire.

It is also known that some high pressure air hoses are included with a tire gauge so that the pressure can be determined without removing the air hose from the valve stem. However, removal of the air hose from the tire valve stem is still required to release air from the tire, and the air hose must be reapplied to the valve stem in order to read the remaining pressure int he tire after release of an undeterminable amount of air pressure.

Those skilled in the art will appreciate that there is a need for a tire pressure gauge and inflation/deflation device which allows both inflation and deflation of the tire without removal of the tire pressure gauge from the tire valve stem.

OBJECTS AND SUMMARY OF THE INVENTION

Accordingly, the present invention has been made to achieve the following objects:

An object of the invention is to provide a tire gauge having an accurate air pressure sensor and display.

Another object of the invention is to provide a tire pressure gauge through which air can be added to a tire.

Yet another object of the invention is to provide an air pressure release valve on the tire pressure gauge to permit release of air from the tire without removing the tire pressure gauge from the tire valve stem.

A further object of the invention is to provide a tire pressure gauge which allows constant display of the air pressure as air is being added or released from the tire.

Yet another object of the invention is to provide a portable, hand held, tire pressure gauge and inflation/deflation device being battery operated and adapted for complementary use with conventional air inflation hoses.

Still another object of the invention is to provide a tire pressure gauge having a secure yet quick release device to facilitate easy connection and removal of the tire pressure gauge from the tire valve stem.

In summary, therefore, this invention is directed to a tire pressure gauge. The tire pressure gauge includes an electronic air pressure sensing means and means for securely connecting the tire pressure gauge to a tire valve stem. The tire pressure gauge further allows inflation and deflation of the tire without removing the tire pressure gauge from the tire valve stem.

These and other objects and advantages of the invention will be readily apparent in view of the following description and drawings of the above-described invention.

BRIEF DESCRIPTION OF THE DRAWINGS

The above and other objects and advantages and novel features will be apparent in view of the following detailed description of the preferred embodiment of the invention illustrated in the accompanying drawings, wherein.

DETAILED DESCRIPTION OF THE INVENTION

Figures 1, 2, 3, 4:
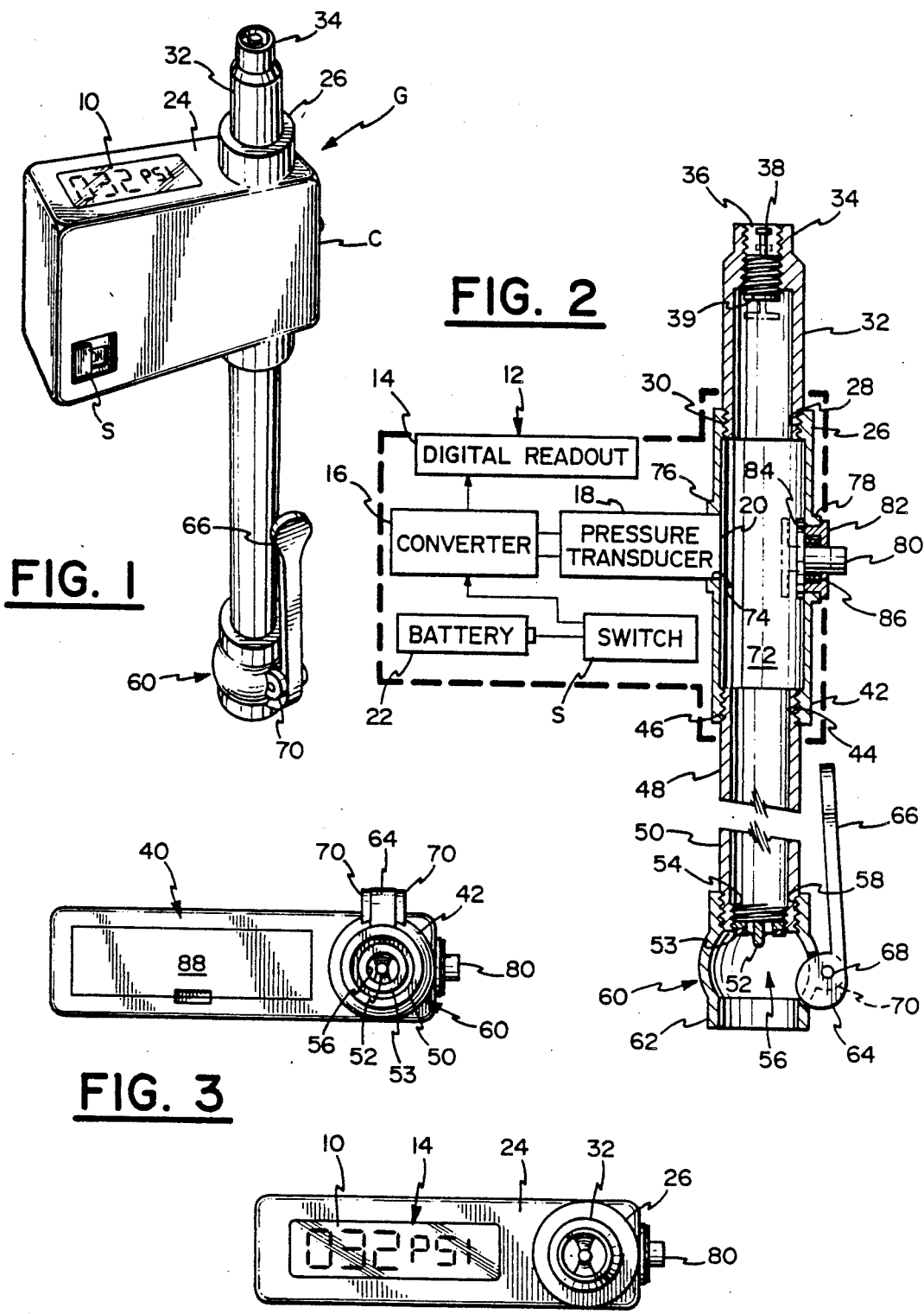
FIG. 1 is a perspective view of the tire pressure gauge showing the digital read-out display.
FIG. 2 is a cross sectional view of the tire pressure gauge of FIG. 1 including a block diagram of the electronic components located within the gauge.
FIG. 3 is a bottom plan view of the tire pressure gauge of FIG. 1.
FIG. 4 is a top plan view of the tire pressure gauge of FIG. 1.

Referring now to the drawings and more particularly to FIGS. 1 and 2, there is shown a tire pressure gauge G having, in the preferred embodiment, a generally rectangular casing C having a window 10 for viewing the numerical display produced by the electronic unit 12. Casing C is preferably sized and shaped to be hand held by one hand while the other hand holds the air hose.

As best shown by the block diagram in FIG. 2, electronic unit 12 includes a digital read-out device 14 which produces the numerical display observed through window 10. The numerical display produced by the digital read-out 14 is fed to the digital read-out device 14 by a central processing unit or converter 16 which receives a signal from the pressure transducer 18 which measures the air pressure on wall 20 of pressure transducer 18. Pressure transducer 18 is preferably of piezoresistive design which requires a small amount of power in order to operate.

Electrical power is supplied to the pressure transducer 18 and converter 16 by a suitable power source such as battery 22. It should be recognized that while battery 22 is a preferred power source, other power sources could be used such as a photoelectric cell or an electric cord attachment to cigar lighter of a vehicle.

Power is supplied to converter 16 from battery 22 when switch 5 is moved to the "on" position as shown in FIG. 1. Preferably switch 5 is a slide switch although other types such as a pressure switch or button switch could be used, for example.

Top side 24 of casing C includes a collar 26 having internal threads 28 for complementary engagement with threads 30 on air tube 32. According to the preferred embodiment of the invention, when threads 30 of air tube 32 are properly inserted into threads 28 of collar 24, an airtight seal is formed between air tube 32 and casing C and air tube 32 extends about 2 inches above casing C.

At upper end 34 of air tube 32 there is preferably located an opening 36 having located therein needle valve 38. Needle valve 38 includes a spring-biased seat 39 which opens and closes in response to application of pressure to needle valve 38. Seat 39 is normally biased in the closed position.

Upper end 34 is sized to receive a conventional air pressure hose inflation fitting.

FIG. 4 is a top view of the tire gauge showing the top side and showing the collar 26 encircling air tube 32. Also shown in FIG. 4 is the central location of needle valve 38 relative to opening 36.

The bottom 40 of casing C is best shown in FIG. 3. A collar 42 extends outwardly from bottom 40 and includes internal threads 44 thereon as shown in FIG. 2 for complementary airtight engagement with threads 46 of air tube 48.

Air tube 48 extends outwardly from casing collar 42 a distance of about 7 inches which provides sufficient spacing from the tire to allow a clear view of window 10 for observing the digital read-out 14. Tire valve engaging end 50 of air tube 48 includes a tire valve needle depressor 52 and an air seal 53 formed of a ring of resilient material such as rubber or plastic. Tire valve needle depressor 52 is threadably secured to the threaded interior wall 54 of end 50 of air tube 48. Depressor 52 threadably engages interior wall 54 so that its location and that of seal 53 relative to opening 56 can be varied.

End 50 is also exteriorly threaded for complementary engagement with the threaded interior 58 of quick release member 60.

Quick release member 60 includes a housing 62 which is adapted to be slipped over the valve stem of a tire until sealing ring 53 contacts the tire valve stem to form an airtight seal. Housing 62 includes a camming member 64, camming member 64 includes a handle 66 for facilitating pivoting of the mounting member about pivot pin 68 which is held in position by a pair of ears 70. Camming member 64 is shaped advantageously so that after insertion of the tire valve stem within the housing 62, handle 66 may be moved such that a cam is exerted against the tire valve stem to lock the gauge G onto the tire valve stem in an airtight manner and hold the gauge G in position.

Quick release member may be removed from end 50 of air tube 48 and threaded interior wall 54 may be directly screwed onto the tire valve stem if desired. The threaded engagement of interior wall 54 and the threaded tire valve stem creates an airtight seal.

Since depressor 52 may be moved vertically by screwing into or out of opening 56 so that depressor 52 may be inserted deeper into opening 56 when gauge G is threadably attached to a tire valve stem. When the quick release member 60 is being used it is preferable that depressor 52 is screwed further outwardly to insure that the needle valve on the associated tire valve is depressed when quick release member 60 engages the tire valve stem.

As shown in FIG. 2, a chamber 72 is formed interiorly of casing C between collars 26 and 42. Pressure transducer 18 enters opening 74 in air chamber 72. Sleeve 76 forms an air tight seal around pressure transducer wall 20 and prevents air from escaping from chamber 72.

Chamber 72 also includes a sleeve 78 surrounding pressure release button 80. Pressure release button 80 includes a housing 82 which provides an air tight seal within sleeve 78. Air is relieved from chamber 72 by depressing pressure release button 80 which causes seat 84 to move away from housing 82 and allows air to pass out of chamber 72. Seat 84 is normally retained against housing 82 by a biased spring 86 which pulls seat 84 against housing 82.

A door 88 is located on bottom 40 of casing C. Door 88 is removable for access to battery 22 to facilitate replacement of a discharged battery.

Preferably casing C is formed of plastic for light weight while air tubes 32 and 48 are formed of metal for increased thread life.

OPERATION

To use the above described device, quick release member 60 is slipped over the valve stem of a tire which causes the needle valve of the conventional tire valve to be depressed thus opening the valve. Cam 64 is then moved to lock tire gauge G onto the tire valve stem. As previously described, an alternative means of attachment is to threadably attach end 50 of air tube 48 onto the tire valve stem or to simply hold the g end 50 against the tire valve stem to depress the needle of the tire valve stem.

Once connection is made, the needle valve of the tire valve stem is depressed and air from a pressurized tire will flow into air tube 48 and chamber 72 and air tube 32. Upper end 34 of air tube 32 is sealed by needle valve 38, thus the pressure is retained within air tubes 48 and 32 and air chamber 72. At this point the tire pressure can be read through window 10 as displayed on digital readout 14.

If additional air is needed, then a high pressure air hose of conventional design having a supply of high pressure air is placed on opening 36 which will cause needle valve 38 to be depressed and air can flow from the high pressure air source into air tube 32 and through cavity 72 and through air tube 48 into the tire. The air pressure can be read during inflation, however the reading may be somewhat distorted due to the high pressure air flowing through the chamber 72.

If the tire is overinflated, air can be released by depressing pressure release button 80 which will cause seat 84 to be displaced from housing 82 and air can escape from chamber 72 and, consequently, from the tire.

It should be noted that when needle valve 38 is not depressed, spring 39 biases needle valve 38 in a closed position, thereby preventing any escape of air through upper end 34 of air tube 32.

While this invention has been described as having a preferred embodiment, it is to be understood that it is capable of further modifications, uses and/or adaptations which follow in general the principles of the invention and including such departures from the present disclosure as come within known or customary practice in the art to which the invention pertains, and as may be applied to the central features herein before set forth, and fall within the scope of the invention and the limits of the appended claims.

What is claimed is:

1. A hand held tire pressure gauge for attachment to a tire valve stem for measuring and displaying the air pressure in a tire, said tire pressure gauge comprising:
    (a) casing means having a gripping surface and forming an enclosure for containing air pressure detection means and having means for visibly displaying air pressure in a tire,
    (b) said casing having top, bottom, first end, second end, front and back walls, each of said walls being rectangular in shape and together forming said enclosure, (c) an air chamber is located within said enclosure and extends between said top and bottom walls adjacent said first end wall, (d) said air chamber having a first opening at said top wall of said casing means, a second opening at said bottom wall of said casing means, a third opening centrally located at said first end wall of said casing means and a fourth opening located within said enclosure formed by said casing means, (e) air supply hose engagement means connected to and extending from said first opening of said air chamber, (f) tire valve engagement means connected to and extending from said second opening of said air chamber so that direct air communication is obtained between the tire valve and the air supply hose when the tire pressure gauge is in use, (g) air release means operably connected to said first end wall at said third opening of said air chamber, (h) electronic air pressure measuring means located within said enclosure and operably connected at said fourth opening of said air chamber, said electronic air pressure measuring means being electrically operable to determine the air pressure within said air chamber and display the measurement, and, (i) whereby, said casing means is sized for being held with one hand while an air pressure hose is applied at said air supply hose engagement means, and air may be released through said air release mans by a finger of the one hand gripping the casing.

2. The tire pressure gauge as defined in claim 1, wherein:

(a) said air release means is biased to form an airtight seal at said third opening, and air may be released by application of finger pressure to said air release means, and (b) upon withdrawal of finger pressure from said air release means, the airtight seal is reformed.

3. The tire pressure gauge as defined in claim 1, wherein:

(a) said casing means includes a pair of threaded collars each of said collars being connectable to one of said tire valve engagement mans and said air supply hose engagement means.

4. The tire pressure gauge as defined in claim 1, wherein:

(a) said tire valve engagement means includes a cam operated quick release device for facilitating quick attachment to and release from a tire valve stem.

5. The tire pressure gauge as defined in claim 1, wherein:

(a) said valve means for preventing the escape of air from said air chamber through said air supply hose engagement means comprises a needle valve means which is normally closed, but is openable when an air supply hose is applied thereto.

* * * * *